United States Patent [19]

Harada et al.

[11] Patent Number: 5,103,561
[45] Date of Patent: Apr. 14, 1992

[54] GRASS TRIMMER

[75] Inventors: Kazuo Harada, Yokosuka; Toshiya Kurihara, Miura, both of Japan

[73] Assignee: Kioritz Corporation, Tokyo, Japan

[21] Appl. No.: 710,982

[22] Filed: Jun. 6, 1991

[30] Foreign Application Priority Data

Jun. 14, 1990 [JP] Japan .................. 2-62268[U]

[51] Int. Cl.[5] .................. B26B 7/00; B26B 9/00; B26B 13/00
[52] U.S. Cl. .................. 30/276; 30/347
[58] Field of Search .................. 30/276, 292, 300, 306, 30/310, 347, 263; 56/255

[56] References Cited

U.S. PATENT DOCUMENTS

| | | | |
|---|---|---|---|
| 3,781,991 | 1/1974 | Stretton et al. | 30/276 |
| 4,300,336 | 11/1981 | Miyata | 30/276 |
| 4,633,658 | 1/1987 | Nogawa . | |
| 4,736,573 | 4/1988 | Seck | 30/276 |
| 4,881,363 | 11/1989 | Terai et al. | 30/276 |

Primary Examiner—Douglas D. Watts
Assistant Examiner—Paul M. Heyrana, Sr.
Attorney, Agent, or Firm—Browdy and Neimark

[57] ABSTRACT

A grass trimmer having a cutting blade mounting head portion in which an output is disposed, and a cutting blade mounting member is provided for mounting a cutting blade. The output shaft has a relative rotation preventing engagement portion formed on a lower portion thereof, and a fitting centering portion formed on a portion of the output shaft which is immediately above and adjacent to the relative rotation preventing engagement portion. The cutting blade mounting member has a central hole extending therethrough, and the inner periphery of the central hole has a fitting portion and a coaxial engagement portion, both formed thereon, the fitting portion being capable of fitting on the relative rotation preventing engagement portion of the output shaft, and the coaxial engagement portion being engageable with the fitting centering portion of the output shaft.

1 Claim, 1 Drawing Sheet

GRASS TRIMMER

BACKGROUND OF THE INVENTION

The present invention relates to a grass trimmer and, more particularly, to a structure of a grass trimmer that allows a cutting blade to be correctly mounted in coaxial relationship with an output shaft in a cutting blade mounting head portion of the grass trimmer.

A grass trimmer has a cutting blade mounting head portion located at, for example, the forward end of an elongated operation column. A cutting blade, such as a disc saw blade, is dismountably mounted, through a cutting blade mounting member, to the output shaft in the cutting blade mounting head portion, so that the cutting blade is driven and rotated by the power from a prime mover, such as an internal combustion engine, at the rearward end of the operation column. During operation, the cutting blade and the cutting blade mounting member are rotated at a high speed. Therefore, it is necessary that, in order to prevent generation of abnormal vibration during operation, the blade and the blade mounting member be mounted to the output shaft while they are correctly centered with respect to the output shaft. For this purpose, it has been necessary that the fitting portion such as a spline portion, at which the output shaft and the cutting blade mounting member are fitted together in such a manner as to prevent them from rotating relative to each other, be formed by a cutting process performed with a high level of precision. This machining necessitates a very high processing cost, and thus involves a disadvantage.

SUMMARY OF THE INVENTION

In view of the above, an object of the present invention is to provide a grass trimmer which is capable of eliminating said disadvantage of the prior art, and which has a simple and convenient structure.

According to the present invention, there is provided a grass trimmer comprising: an output shaft disposed in a cutting blade mounting head portion of the grass trimmer; a relative rotation preventing engagement portion formed on a lower portion of the output shaft; a fitting centering portion formed on a portion of the output shaft which is immediately above and adjacent to the relative rotation preventing engagement portion; a cutting blade mounting member for mounting a cutting blade, the cutting blade mounting member having a central hole extending therethrough; a fitting portion which is formed on the inner periphery of the central hole, and which is capable of fitting on the relative rotation preventing engagement portion of the output shaft; and a coaxial engagement portion which is formed on the inner periphery of the central hole, and which is capable of engaging with the fitting centering portion of the output shaft.

With the above-specified construction, when the cutting blade mounting member is being mounted onto the output shaft, the fitting portion of the member is fitted onto the relative portion preventing engagement portion of the output shaft, and the coaxial engagement portion of the member is guided to and brought into close contact with the fitting centering portion of the output shaft. This arrangement allows the correct centering of the cutting blade and the cutting blade mounting member with respect to the output shaft to be achieved easily and automatically. The level of precision with which the relative rotation preventing engagement portion of the output shaft and the fitting portion of the cutting blade mounting member are formed need not be very high, and the level is sufficient if it corresponds to a level assuring that force of rotation is transmitted between these members. Therefore, it is possible to adopt, as the fitting relationship between these portions, a sliding fitting, a loose fitting or other suitable fitting relationship. Accordingly, it is possible to form the rotation preventing engagement portion and the fitting portion by plastic deformation processing and, hence, to greatly reduce the processing cost.

BRIEF DESCRIPTION OF THE DRAWING

The FIGURE is a vertical sectional view of a cutting blade mounting head portion of a grass trimmer, showing an embodiment of the present invention.

DESCRIPTION OF THE PREFERRED EMBODIMENT

Figure 1:
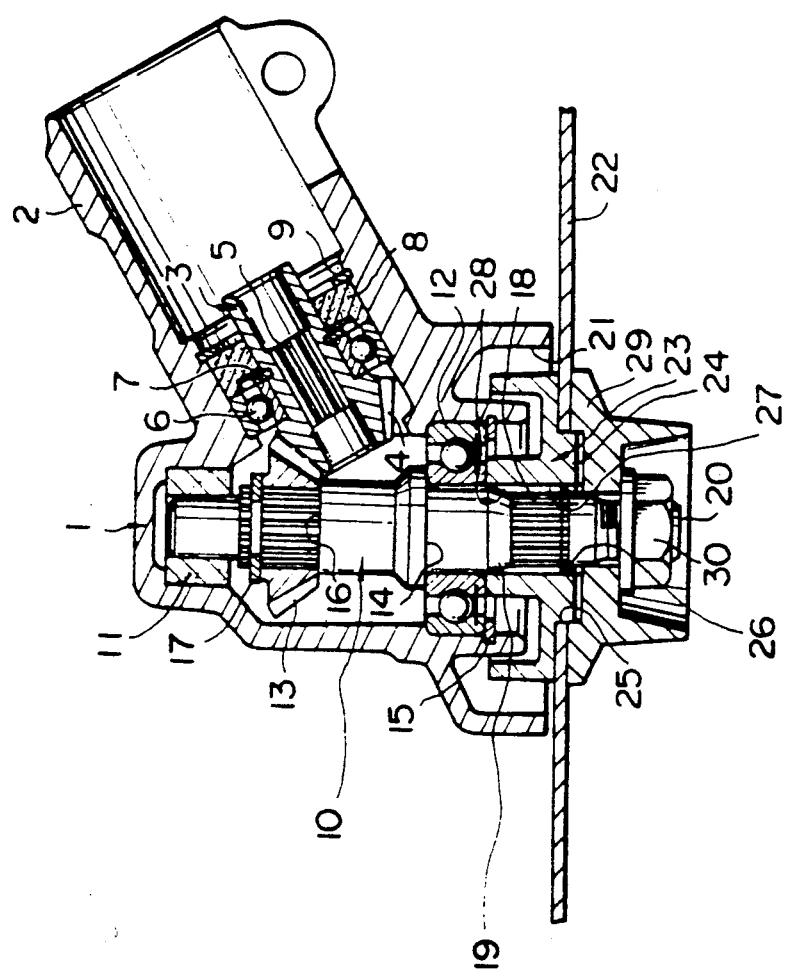

The present invention will now be described with respect to an embodiment thereof, which is illustrated in the sole drawing.

The drawing shows, in vertical section, a cutting blade mounting head portion of a grass trimmer according to this embodiment. The head portion has a body 1 which also serves as a gear case. The body 1 includes a hollow, operation column mounting portion 2 which is formed integral with the body 1 and which projects obliquely upward. The operation column mounting portion 2 allows, as in a common grass trimmer, the forward end portion of the operation column (not shown) of the grass trimmer to be inserted into the portion 2 and dismountably mounted thereto. An input shaft 3 is rotatably supported by the operation column mounting portion 2 in the inside of the portion 2 in the manner described below. The input shaft 3 has a driving bevel gear 4 formed integral with the axially inward end (the forward end) of the shaft 3, and a link portion 5 formed on a radially inner portion of the shaft 3 for linking the input shaft 3 with the output end of a drive shaft (not shown) within the operation column.

The input shaft 3 is rotatably supported by the operation column mounting portion 2 in the inside thereof through a sealless ball bearing 6 at a portion of the input shaft 3 which is close to the axially outward end (the proximal end) of the driving bevel gear 4. The ball bearing 6 has its outer race kept in press-contact with an inner surface of the operation column mounting portion 2, and its inner race in press-contact with an outer peripheral surface of the input shaft 3. The position of the ball bearing 6 is determined by the proximal end of the driving bevel gear 4 and an on-shaft retainer ring 7 fitted in an annular groove formed on the input shaft 3. The input shaft 3 is rotatably supported also through an oilless metal bearing 8 disposed axially outward of the ball bearing 6. The oilless metal bearing 8 has a peripheral portion of the axially inward end thereof abutting on the outer race of the ball bearing 6, and also has the axially outward end thereof abutting on an in-hole retainer ring 9 fitted in an annular groove formed in the inner surface of the operation column mounting portion 2 of the body 1, whereby the position of the oilless metal bearing 8 is determined. By virtue of the above-described construction, the gear-lubricating grease within the body 1 is prevented from leaking to the outside by the oilless metal bearing 8. Further, the on-shaft retainer ring 7 and the in-hole retainer ring 9 serve, at their different axial positions of assembly, to hold the input shaft 3, the ball bearing 6 and the oilless metal bearing 8 in place in such a manner as to prevent axial displacement of these members. Still further, because the above-described members are assembled at different positions, the on-shaft retainer ring 7 has a increased degree of freedom in the radially outward direction, while the in-hole retainer ring 9 has an increased degree of freedom in the radially inward direction. This makes it possible for the retainer rings 7 and 9 to be composed of common C-shaped retainer rings which are commercially available in general, thereby enabling a reduction in the cost, easy assembly and disassembly of the retainer rings, and other advantages.

The body 1 of the head portion receives an output shaft 10 vertically disposed therein. The output shaft 10 is rotatably supported by an oilless metal bearing 11 at the upper end of the shaft 10, and a sealed ball bearing 12 at a lower portion of the shaft 10. A driven bevel gear 13 in meshing engagement with the driving bevel gear 4 is provided on the output shaft 10 at a position between the oilless metal bearing 11 and the sealed ball bearing 12. The oilless metal bearing 11 has its outer peripheral surface kept in press-contact with the inner surface of the upper portion of the body 1, whereby the oilless metal bearing 11 is fixed in place. The sealed ball bearing 12 has the upper end of the inner race thereof abutting on a downward annular stepped portion 14 formed on the output shaft 10, and also has the lower end of the outer race thereof held by an in-hole retainer ring 15 fitted in an annular groove formed in the inner surface of the lower end portion of the body 1. The driven bevel gear 13 has its lower end abutting on an upward annular stepped portion 16 formed on the output shaft 10, with the upper end being held by an on-shaft retainer ring 17 fitted in an annular groove formed on the output shaft 10 in such a manner as to be prevented from axial displacement. Thus, the output shaft 10 is held in place and prevented from dropping off by members at two different axial positions, i.e., the in-hole retainer ring 15 and the bevel gear 13 in meshing engagement with the driving bevel gear 4. This allows an increased level of safety. In addition, the same advantages as those provided by the on-shaft retainer ring 7 and the in-hole retainer ring 9 associated with the input shaft 3 are provided concerning the output shaft 10. Furthermore, since the axial load of the output shaft 10 is sustained only by the sealed ball bearing 12 at the above-described lower portion, the upper bearing can be composed of the oilless metal bearing 11, as described above, thereby enabling a further reduction in the cost.

The output shaft 10 has a spline or serration portion 18 on the outer peripheral surface of a lower portion thereof, and an outer-surface taper portion 19, immediately above and adjacent to the portion 18, whose diameter increases upward. The spline or serration portion 18 serves as the relative rotation preventing engagement portion, and the outer-surface taper portion 19 serves as the fitting centering portion. The lower end of the output shaft 10 projects downward from a lower end opening 21 of the body 1.

A cutting blade 22 is disc-shaped, with a cutting portion (not shown), such as saw teeth, being formed on the periphery thereof. The cutting blade 22 has a circular central hole 25 fitting on a circular central protrusion 24 of a cutting blade mounting member 23. The cutting blade mounting member 23 has a central hole 26 extending through the center thereof, the central hole 26 being coaxial with the circular central protrusion 24 of the member 23. Formed on the inner peripheral surface of the central hole 26 are: a vertical groove portion 27 having a shape complementary with the spline or serration portion 18 of the output shaft 10; and an inner-surface taper portion 28, immediately above the vertical groove portion 27, having a shape permitting the inner-surface taper portion 28 to closely contact the outer-surface taper portion 19 of the output shaft 10. The vertical groove portion 27 serves as the fitting portion, and the inner-surface taper portion 28 serves as the coaxial engagement portion.

During assembly, when the cutting blade mounting member 23 is mounted onto the output shaft 10 by passing the output shaft 10 through the central hole 26 of the member 23, starting with the lower end 20 of the output shaft 10, the vertical groove portion 27 of the central hole 26 of the cutting blade mounting member 23 slides upward while in meshing engagement with the spline or serration portion 18 of the output shaft 10, and the inner-surface taper portion 28 of the central hole 26 of the member 23 is guided to and brought into close contact with the outer-surface taper portion 19 of the output shaft 10. This arrangement allows the cutting blade mounting member 23 and the cutting blade 22 to be easily and correctly centered with respect to the output shaft 10. When the cutting blade mounting member 23 has thus been mounted on the output shaft 10, the circular central protrusion 24 of the cutting blade mounting member 23 is brought into fitting engagement with the circular central hole 25 of the cutting blade 22. Then, a ring member 29 for holding the cutting blade 22 is abutted against the lower surface of the cutting blade 22. Further, a nut 30 is fastened onto a screw portion at the lower end 20 of the output shaft 10 so that the fastening force of the nut 30 is transmitted through the cutting blade holding ring member 29 to the cutting blade 22 and the cutting blade mounting member 23 whereupon the blade 22 and the blade mounting member 23 are rigidly mounted on the output shaft 10.

In brief, the above-described construction has the following advantages. The correct centering of the cutting blade 22 and the cutting blade mounting member 23 with respect to the output shaft 10 can be achieved easily and automatically by the arrangement in which, during the assembly of the members, the inner-surface taper portion 28 of the cutting blade mounting member 23 is guided to and brought into close contact with the outer-surface taper portion 19 of the output shaft 10. Further, the spline or serration portion 18 of the output shaft 10 and the vertical groove portion 27 of the cutting blade mounting member 23 require that these portions be machined with a certain level of precision which is sufficient to assure the transmission of force of rotation between these members, but do not require the level of machining precision to be very much high. Therefore, these portions 18 and 27 can be brought into certain fitting relationship with each other, such as a sliding fitting, a loose fitting or other suitable fitting. This means that the spline or serration portion 18 and the vertical groove portion 27 can be formed by plastic deformation processing, which is advantageous in, for instance, that the processing cost can be greatly reduced.

What is claimed is:

1. A grass trimmer comprising: an output shaft disposed in a cutting blade mounting head portion of said grass trimmer; a spline or serration portion for relating rotation preventing engagement formed on a lower portion of said output shaft; an outer-surface taper portion for fitting centering formed on a portion of said output shaft which is immediately above and adjacent to said spline or serration portion; a cutting blade mounting member for mounting a cutting blade, said cutting blade mounting member having a central hole extending therethrough; a fitting portion which is formed on the inner periphery of said central hole, and which is capable of fitting on said spline or serration portion of said output shaft; and a coaxial engagement potion which is formed on the inner periphery of said central hole, and which is capable of engaging with said outer-surface taper portion of said output shaft.

* * * * *